United States Patent [19]

Mann

[11] 4,017,292

[45] Apr. 12, 1977

[54] PROCESS FOR MAKING MULTIFOCAL PHOTOCHROMIC OPHTHALMIC LENS

[75] Inventor: George H. Mann, Corning, N.Y.

[73] Assignee: Corning Glass Works, Corning, N.Y.

[22] Filed: Jan. 15, 1976

[21] Appl. No.: 649,474

Related U.S. Application Data

[63] Continuation-in-part of Ser. No. 636,126, Nov. 28, 1975, abandoned, which is a continuation-in-part of Ser. No. 491,786, July 25, 1974, abandoned.

[52] U.S. Cl. .................................. 65/33; 65/37; 65/DIG. 2; 106/53; 106/73.2; 106/DIG. 6
[51] Int. Cl.² .................. C03B 32/00; C03B 11/08; C03C 3/04
[58] Field of Search ............. 65/38, 37, DIG. 2, 33; 106/53, 73.2, DIG. 6

[56] References Cited

UNITED STATES PATENTS 3,966,311  6/1976  Korn et al. .................. 65/38 X

*Primary Examiner*—S. Leon Bashore
*Assistant Examiner*—Frank W. Miga
*Attorney, Agent, or Firm*—Kees van der Sterre; Clinton S. Janes, Jr.; Clarence R. Patty, Jr.

[57] ABSTRACT

Multifocal photochromic opthalmic lenses are produced by nucleating potentially photochromic major lens blanks through heat treatment, combining the nucleated blanks with compatible button or segment glasses, and fusing the combined glasses at temperatures suitable for achieving both fusion and the simultaneous development of full photochromic properties in the previously nucleated major lens blanks.

5 Claims, No Drawings

PROCESS FOR MAKING MULTIFOCAL PHOTOCHROMIC OPHTHALMIC LENS

This application is a continuation-in-part of my co-pending application Ser. No. 636,126 filed Nov. 28, 1975 now abandoned, which is a continuation-in-part of my application Ser. No. 491,786, filed July 25, 1974, now abandoned.

Multifocal ophthalmic lenses are manufactured by sealing one or more small glass buttons or segments of a high refractive index glass into a recess in a major glass lens blank molded from a crown glass in a manner well known to the ophthalmic glassmaking art. Hence, in conventional practice, the major lens blank is made from a spectacle crown glass having a refractive index of approximately 1.523 and the button or segment glass has a higher refractive index, commonly in the range of 1.57–1.71, the selection of index being independent upon the degree of visual correction demanded in the finished multifocal lens.

A recent development in the ophthalmic field has involved the introduction of photochromic ophthalmic lenses. Photochromic glasses, or phototropic glasses as such have been variously called, are described in U.S. Pat. No. 3,208,860, the basic patent in the field. As is explained therein, photochromic glasses darken under the influence of actinic radiation, normally ultraviolet radiation, and will return to the clear state when the actinic radiation is removed. Such glasses, index corrected to 1.523, have been and are presently being marketed as ophthalmic lenses by Corning Glass Works under the registered trademarks PHOTOGRAY and PHOTOSUN.

Important properties which must be maintained in photochromic glasses marketed for ophthalmic applications are optical clarity, visible transmission and color in the clear state, visible transmission and color in the activated or darkened state, and the rates of darkening and fading of the glass. These properties depend not only upon the composition of the glass, but also in a complex manner upon the heat treatment utilized to convert potentially photochromic glass to the photochromic product.

In photochromic ophthalmic glasses of the commercially-available type, photochromic properties are generally attributed to the presence in the glass of tiny (sub-micron size) crystallites of silver halide, which crystals are grown in situ from potentially photochromic glasses containing dissolved silver and halogens by appropriate heat treatment. The rate, length, and degree of the heat treatment affect the number and size of the silver halide crystallites which in turn affect the color, clarity, and photochromic darkening and fading characteristics of the resulting glass.

It has recently become desirable to produce multifocal ophthalmic lenses wherein at least the major lens portion of the multifocal lens exhibits photochromic properties. Such lenses may be produced by combining a photochromic major lens blank with one or more minor glass lens segments or buttons and subjecting the combination to a fusing heat treatment at temperatures near the softening points of the glass components. U.S. Pat. No. 3,801,336 suggests manufacturing a photochromic product by combining a major lens portion made up of a photochromic glass with an ophthalmic segment glass and subjecting the combination to a fusing heat treatment at 1150° F. to provide a multifocal product.

However, it has been found that fusion treatments of the aforementioned type can undesirably affect the photochromic properties of the photochromic major lens blank. After fusing, a photochromic lens blank exhibits a higher level of light transmission and a browner color in the darkened state, and a yellower color in the faded state, than prior to exposure darkenable the fusion treatment. Hence, the glass is not as darkenble as normally-treated photochromic glass of equivalent composition. This essentially amounts to an undesirable overdevelopment of the photochromic properties of the glass. In addition, the changes in photochromic properties brought about by overdevelopment of the glass vary considerably depending upon the composition of the glass and fusion treatment employed. Thus, the achievement of uniform color and quality in photochromic multifocal lenses produced in this manner is quite difficult. And, finally, photochromic blanks subjected to the fusion process exhiit noticeably exhibit optical clarity due to the development of haze in the glass during heat treatment.

It is therefore the principal objective of the present invention to provide a method of producing multifocal photochromic ophthalmic lenses to improved optical quality exhibiting uniform and reproducible photochromic properties utilizing presently available materials.

In theory, this objective could be achieved by utilizing the same heat treatment to develop the photochromic properties of the major lens glass and simultaneously fuse the major lens glass to the selected button or segment glass. However, conventional treatments employed in the art to fuse segment or button glasses to major lens components, although utilizing high temperatures, typically involve various heating rates to these temperatures such that uniform formation and growth of photochromic crystallites in the glass is not obtained and ophthalmic products of diverse photochromic properties are produced.

Therefore, according to the present invention, the major lens in the form of a potentially photochromic glass lens blank is subjected, prior to the fusing treatment, to a nucleating heat treatment at a temperature above the annealing point of the glass for a time sufficient to initiate the growth of silver halide crystals therein. This treatment produces a glass, termed a nucleated glass, which is not photochromic but which is capable of developing a consistent level of silver halide crystallinity and thus reproducible photochromic properties upon exposure to subsequent fusion treatments.

After the potentially photochromic major lens blank has been exposed to a nucleating heat treatment as above described, it is subjected in combination with selected button or segment glasses to a fusing and developing heat treatment. The fusing and developing treatment employed is one involving exposure of the combination of glasses to a temperature near the softening point for a time sufficient to both develop photochromic properties in the nucleated glass and fuse the selected segment glass to the photochromic major lens blank. Conventional fusion heat treatments employed in the ophthalmic art to fuse multifocal lens components together are quite suitable for this purpose. Thus, properly nucleated lenses may be combined with segment glasses utilizing presently available fusion treatments to obtain a more uniform multifocal photochromic product.

Multifocal photochromic ophthalmic lenses produced according to this process are of an optical quality and photochromic darkenability essentially equivalent to "single vision" lenses of corresponding composition. Moreover, the key photochromic properties of the resultant glasses are found to be somewhat insensitive to moderate variations in the nucleation and subsequent fusion treatments employed, provided that other important property-determining variables are not changed. For this reason, the process of the invention provides an advantageous method for producing high quality multifocal ophthalmic lenses exhibiting uniform photochromic properties.

Photochromic glasses which may be used in the manufacture of ophthalmic products include many of the silver halide-containing silicate glasses described by Armistead and Stookey in U.S. Pat. No. 3,208,860. However, glasses which are preferred for ophthalmic applications are those such as described in U.S. Pat. No. 3,197,296 to Eppler and Stookey which demonstrate rapid fading and a high degree of darkening in ophthalmic thicknesses (i.e., about 2 mm.) when exposed to the sun rays. For the purposes of the present invention, preferred glasses consist essentially, in weight percent on the oxide basis as calculated from the batch, of about 48–57% $SiO_2$, 6–10% $Al_2O_3$, 15–22% $B_2O_3$, 0.8–2% $Na_2O$, 2.4–3.1% $Li_2O$, 0–4% $K_2O$, 3.2–7.2% $Na_2O + Li_2O + K_2O$, 4.5–5.3% PbO, 3–9% BaO, 0–7.2% $ZrO_2$, 0.10–0.6% Ag, 0.01–0.1% CuO, 0.15–1.2% Cl, 0–1.0% Br, 0–0.1% I, and 0–1.2% F.

Of course, these glasses may contain minor amounts of other oxides which are useful to modify certain glass properties, provided the photochromic response and heat treating behavior thereof are not deleteriously affected. Particularly useful are the glass coloring agents such as the transition metal oxide and rare earth metal oxide colorants which have been found to be compatible with photochromic glasses. Thus about 0–0.5% CoO, 0–1.0% NiO, 0–1.0% $Cr_2O_3$ and 0–5.0% total of oxides selected from the group consisting of $Er_2O_3$, $Pr_2O_3$, $Ho_2O_3$ and $Nd_2O_3$ may optionally be included in the glass as ingredients to modify the color thereof, if desired.

Glass lenses can be formed from the above compositions by melting a glass batch of the required composition in a non-reducing atmosphere at temperatures in the 1400°–1500° C. range for a time of from 4–8 hours to produce a melt which can then be formed into ophthalmic lens blanks by conventional procedures. The resulting blanks are generally not photochromic without further heat treatment, but are potentially photochromic and are converted to photochromic lens components by subsequent nucleation and fusion treatments.

Nucleation treatments which may be employed with potentially photochromic lens components produced as above described suitably comprise exposure of the lens to temperatures in the range of about 510°–550° C. for a time in the range of about 10–50 minutes followed by cooling to room temperature. The components may be annealed before, during, or subsequent to nucleation if desired. Lens components treated in this manner are still not photochromic. However, they are stable and may be shipped or stored indefinitely without affecting the capability of the nucleated glass to be converted to a photochromic lens component upon exposure to thermal treatments such as may be employed for multifocal lens fusing.

A multifocal lens exhibiting desirable and reproducible photochromic properties is ultimately fabricated from nucleated major lens blank produced as above described by combining a nucleated blank with at least one suitable ophthalmic segment glass and subjecting the combination to a fusion treatment at temperatures in the 630°–675° C. range for times in the range of 15–45 minutes. A typical fusion cycle involves heating the major lens and lens segment glass at 20° C./minute to 650° C., holding at 650° C. for 30 minutes cooling at the rate of 15° C./minute to 450° C., and finally cooling at the rate of 10° C./minute to about 200° C. before removing from the furnace.

Of course, since nucleation, fusion, and photochromic development processes are both time and temperature dependent, it will be recognized that shorter heating times are primarily useful at the higher temperatures within the specified ranges, and vice versa. Similarly, it will be appreciated that the glass need not be held at any single temperature in the specified range, since equivalent results may obviously be obtained by continuous heating and cooling of the glass through the range, provided that the total time in the range is held within the specified limits. Thus, for example, nucleation and annealing may be carried out by subjecting as-formed lens blanks to a continuous controlled cooling of the glass through the nucleation and annealing ranges, if desired.

The button or segment glass employed in making photochromic multifocal ophthalmic lenses need not be a photochromic glass, and is desirably a clear glass of optical quality having the desired softness and expansion for fusion to the selected photochromic glass major lens blank. Of course, it must also have the chemical durability, refraction and dispersion properties required for ophthalmic glasses. Examples of such glasses are disclosed in U.S. Pat. No. 3,973,976, issued Aug. 10, 1976, based on application Ser. No. 629,798, filed Nov. 7, 1975, a continuation-in-part of U.S. patent application Ser. No. 475,665, filed June 3, 1974 by David C. Boyd and commonly assigned herewith.

The segment glass may also be a photochromic glass of the silver halide type. However, in that event it may be desirable to select a nucleated segment glass prepared in a manner similar to the nucleated major lens blanks above described, rather than a fully photochromic segment glass. In this way, over-development of the photochromic properties of the segment glass during the fusion process may be avoided.

I have found that, if the composition of the potentially photochromic major lens blank is held relatively constant, particularly with respect to the silver, halogen and copper oxide concentrations which have a large effect on photochromic properties, then the resulting multifocal lens will have reproducible photochromic properties despite changes in nucleation heat treatment. Thus, with equivalent starting compositions, all nucleation treatments between about 510°–550° C. and 10–50 minutes produce nucleated glasses which, after exposure to a standard fusing cycle, exhibit essentially equivalent photochromic and optical properties.

The photochromic properties of the multifocal product also exhibit low sensitivity to variations in the fusion cycle employed to fuse the nucleated glass to the selected segment glass. Thus, control of the fusion cycle to give uniform photochromic properties in the product is not difficult. Taking the darkened visible transmission of the multifocal photochromic product as a representative property, changes in peak fusion temperature of about ±7° C. or changes in time at peak fusion temperature of about ±7 minutes change the darkened visible transmission of the product less than 2%. Thus, preferred fusion treatments comprising exposure to peak fusion temperatures in the range of 640°–660° C. for times in the range of about 20–30 minutes have been found to provide both sufficient fusion and adequate and uniform development of photochromic properties in potentially photochromic lens components nucleated as above described.

The rate of cooling from the fusion temperature can also affect the darkened visible transmission of the photochromic lens, with slower rates typically yielding darker glasses and vice versa. It is therefore preferred that the cooling rate from the peak fusion temperature to near the annealing range (about 525° C.) be rapid (about 15° C./minute) and that the cooling rate from 525° C. down to at least about 200° C. be maintained between about 2–10° C./minute. This preferred cooling treatment can maintain variations in darkened optical transmission below about 2–4% in the finished product.

The invention may be further understood by reference to the following detailed example setting forth the presently preferred method for carrying out the present invention.

EXAMPLE I

An ophthalmic lens blank formed of a potentially photochromic glass is provided, having the following approximate composition, in parts by weight: 55.4 parts $SiO_2$, 9.0 parts $Al_2O_3$, 6.7 parts BaO, 5.0 parts PbO, 0.150Ag, 0.250 parts Cl, 0.140 parts Br, 0.029 parts CuO, 0.2 parts F, 1.9 parts $Na_2O$, 16.1 parts $B_2O_3$, 2.1 parts $ZrO_2$, and 2.6 parts $Li_2O$.

This lens blank is subjected to a nucleation heat treatment comprising exposure to a temperature of about 540° C. for a time of about 20 minutes, and is then cooled to room temperature.

The nucleated lens blank prepared as described as combined with a clear button of an ophthalmic segment glass having a composition, in weight percent, of about 36.8% $SiO_2$, 4.85% $B_2O_3$, 5.85% $Al_2O_3$, 49.0% PbO, 0.2% $Li_2O$, 3.0% $La_2O_3$, and 0.3% $As_2O_3$. The button and lens blank are then subjected to a fusion treatment as follows: heat at 20° c./minute to 650° C., hold at 650° C. for 30 minutes, cool at the rate of 15° C./minute from 650° to 525° C., cool at the rate of 5° C./minute from 525° to 450° C., cool at the rate of 10° C. per minute from 450° to 200° C., and finally cool to room temperature.

Examination of the fused multifocal photochromic lens blank after exposure to this treatment shows complete fusion between the major photochromic lens blank and the clear button glass. The major photochromic lens portion has excellent photochromic properties. It demonstrates an optical transmission in the fully darkened state of about 46% which is comparable to transmission levels exhibited by commercially-available single vision lenses of equivalent composition. The darkening and fading characteristics of the photochromic lens are also comparable to such prior art single version lenses, as is the optical clarity of the glass.

The optical and photochromic properties obtainable in accordance with the invention as above described are substantially better than are obtained utilizing prior art procedures such as illustrated in the following comparative example.

EXAMPLE II

A number of ophthalmic lens blanks, having a composition essentially equivalent to the blank treated in accordance with Example I, may be heat treated to provide optical and photochromic properties essentially equivalent to commercially-available single vision lenses, including excellent optical clarity and optical transmittances, in the fully darkened state in 2 millimeter cross-section, averaging about 46%.

These photochromic lens blanks may be ground to a configuration suitable for accepting ophthalmic segments, thereafter provided with segments of the segment composition shown in Example I, and then subjected to a conventional fusion treatment such as utilized in Example I, comprising heating at 20° C./minute to 650° C., holding at 650° C. for 30 minutes, cooling at a rate of 15° C./minute from 650° to 525° C., cooling at a rate of 5° C./minute from 525° to 450° C., cooling at the rate of 10° C./minute from 450° to 200° C., and finally cooling at room temperature.

Fused multifocal ophthalmic lenses of this type, produced according to the above-described procedure, normally exhibit significantly degraded photochromic and optical properties. The optical clarity of the product is typically substantially reduced through the development of haze in the photochromic major lens portion. Optical transmittances for the fully darkened glass, measured in 2 millimeter cross-section, typically fall in the range of 50–54% which is substantially higher than an equivalent single vision product.

In contrast to the above results, multifocal photochromic ophthalmic lenses provided in accordance with the invention as described in Example I typically exhibit substantially improved optical clarity, essentially equivalent to single vision lenses of equivalent compositions. Moreover, the lenses exhibit an optical transmittance in the fully darkened state which does not substantially exceed the fully darkened transmittance of a single vision lens of equivalent composition and thickness. Thus darkened transmittances averaging 46% and not exceeding 49% in 2 millimeter cross-section are readily obtainable in the multifocal photochromic product utilizing the process of the present invention.

I claim:

1. A process for manufacturing a photochromic multifocal ophthalmic lens comprising a major lens portion composed of a photochromic glass and at least one lens segment fused to the major lens portion composed of a glass having a higher index of refraction than the major lens portion, comprising the steps of:
   a. providing a major lens portion composed of a silver halide-containing glass consisting essentially, in weight percent on the oxide basis, of about 48–57% $SiO_2$, 6–10% $Al_2O_3$, 15–22% $B_2O_3$, 0.8–2% $Na_2O$, 2.4–3.1% $Li_2O$, 0–4% $K_2O$, 3.2–7.2% $Na_2O + Li_2O + K_2O$, 4.5–5.3% PbO, 3–9% BaO, 0–7.2% $ZrO_2$, 0.10–0.6% Ag, 0.01–0.10% CuO, 0.15–1.2% Cl, 0–1.0% Br, 0–0.1% I, and 0–1.2% F, which lens portion is potentially photochromic;
   b. subjecting the potentially photochromic major lens portion to a nucleating heat treatment at a temperature in the range of about 510°–550° C. for a time in the range of about 10–50 minutes to initiate the growth of silver halide crystals therein, said time being insufficient to render the major lens portion photochromic but to provide a nucleated major lens portion;

c. combining the nucleated major lens portion with at least one lens segment composed of a glass having a higher index of refraction than the major lens portion;

d. subjecting the nucleated major lens portion and lens segment to a fusion heat treatment comprising exposure to a temperature in the range of about 635°–670° C. for a time in the range of about 15–45 minutes, to develop the photochromic properties of the nucleated major lens portion and to fuse the lens segment thereto; and e. cooling the fused major lens portion and lens segment.

2. A process according to claim 1 wherein the nucleated major lens portion and lens segment are subjected to a fusion heat treatment comprising exposure to a temperature in the range of about 640°–660° C. for a time in the range of about 20–30 minutes.

3. A process according to claim 2 wherein the fused major lens portion and lens segment are cooled at a cooling rate in the range of about 2°–10° C./minute over the range from about 525°–200° C.

4. A process according to claim 1 wherein the major lens portion additionally contains at least one glass coloring agent selected in the indicated proportion from the group consisting of 0–0.5% CoO, 0–1.0% NiO, 0–1.0% $Cr_2O_3$ and 0–5.0% total of oxides selected from the group consisting of $Er_2O_3$, $Pr_2O_3$, $Ho_2O_3$ and $Nd_2O_3$.

5. A process for manufacturing a photochromic multifocal ophthalmic lens comprising a major lens portion composed of a photochromic glass and at least one lens segment fused to the major lens portion composed of a glass having a higher index of refraction than the major lens portion, comprising the steps of:

a. providing a major lens portion composed of a silver halide-containing glass which is potentially photochromic, said glass consisting essentially, in weight percent on the oxide basis, of about 48–57% $SiO_2$, 6–10% $Al_2O_3$, 15–22% $B_2O_3$, 0.8–2% $Na_2O$, 2.4–3.1% $Li_2O$, 0–4% $K_2O$, 3.2–7.2% $Na_2O + Ki_2O + K_2O$, 4.5–5.3% PbO, 3–9% BaO, 0–7.2% $ZrO_2$, 0.10–0.6% Ag, 0.01–0.10% CuO, 0.15–1.2% Cl, 0–1.0% Br, 0–0.1% I and 0–1.2% F;

b. subjecting the potentially photochromic major lens portion to a nucleating heat treatment above the annealing point of the glass for a time sufficient to initiate the growth of silver halide crystals therein, but insufficient to render the glass photochromic, to provide a nucleated major lens portion;

c. combining the nucleated major lens portion with at least one lens segment composed of a glass having a higher index of refraction than the major lens portion;

d. subjecting the nucleated major lens portion and lens segment to a fusion heat treatment at a temperature near the softening point of at least one of the glasses for a time sufficient to develop photochromic properties in the nucleated major lens portion and fuse the lens segment thereto; and e. cooling the fused major lens portion and lens segment.

\* \* \* \* \*

UNITED STATES PATENT AND TRADEMARK OFFICE
CERTIFICATE OF CORRECTION

PATENT NO. : 4,017,292
DATED : April 12, 1977
INVENTOR(S) : George H. Mann

It is certified that error appears in the above—identified patent and that said Letters Patent are hereby corrected as shown below:

Column 2, lines 7 and 8, delete "darkenable" and insert therefor -- to --.

Column 2, line 19, "exhiit" should be -- exhibit --.

Column 2, line 20, delete "exhibit" and insert therefor -- reduced --.

Column 3, line 42, "Pr2o3" should be -- $Pr_2O_3$ --.

Column 4, line 12, after "minutes" insert a comma.

Column 5, line 35, "0.150Ag," should be -- 0.150 parts Ag, --.

Column 5, line 65, "version" should be -- vision --.

Column 6, line 23, delete "at" and insert therefor -- to --.

Column 6, line 39, "compositions" should be -- composition --.

Column 8, line 12, Claim 5, "$Ki_2O$" should be -- $Li_2O$ --.

Column 8, line 17, Claim 5, after "treatment" insert -- at a temperature --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*